United States Patent
Boecker et al.

(10) Patent No.: US 7,280,590 B1
(45) Date of Patent: Oct. 9, 2007

(54) RECEIVER TERMINATION NETWORK AND APPLICATION THEREOF

(75) Inventors: Charles W. Boecker, Ames, IA (US); William C. Black, Ames, IA (US); Eric D. Groen, Ankeny, IA (US)

(73) Assignee: Xilinx, Inc., San Jose, CA (US)

( * ) Notice: Subject to any disclaimer, the term of this patent is extended or adjusted under 35 U.S.C. 154(b) by 804 days.

(21) Appl. No.: 10/659,971

(22) Filed: Sep. 11, 2003

(51) Int. Cl.
*H04B 1/38* (2006.01)
*H04B 3/00* (2006.01)
*H04L 27/00* (2006.01)

(52) U.S. Cl. .................. 375/219; 357/257; 357/316
(58) Field of Classification Search ............. 375/257, 375/258, 219, 220, 316; 326/62, 82, 88
See application file for complete search history.

(56) References Cited

U.S. PATENT DOCUMENTS

| | | | | |
|---|---|---|---|---|
| 5,583,359 A | * | 12/1996 | Ng et al. | 257/306 |
| 6,856,169 B2 | * | 2/2005 | Frans et al. | 326/82 |
| 6,927,644 B2 | * | 8/2005 | Toncich | 333/24 C |
| 2002/0149448 A1 | * | 10/2002 | Toncich | 333/205 |
| 2005/0013090 A1 | * | 1/2005 | Ahrens et al. | 361/306.3 |

OTHER PUBLICATIONS

U.S. Appl. No. 10/660,234, filed Sep. 11, 2003, Boecker.
U.S. Appl. No. 10/660,449, filed Sep. 11, 2003, Cory et al.
U.S. Appl. No. 10/660,191, filed Sep. 11, 2003, Kryzak et al.
U.S. Appl. No. 10/660,062, filed Sep. 11, 2003, Groen et al.
U.S. Appl. No. 10/660,448, filed Sep. 11, 2003, Groen et al.
U.S. Appl. No. 10/659,803, filed Sep. 11, 2003, Black et al.
U.S. Appl. No. 10/659,819, filed Sep. 11, 2003, Groen et al.
U.S. Appl. No. 10/659,972, filed Sep. 11, 2003, Shafer.
U.S. Appl. No. 10/660,254, filed Sep. 11, 2003, Groen et al.
U.S. Appl. No. 10,661,016, filed Sep. 11, 2003, Groen et al.
U.S. Appl. No. 10/659,979, filed Sep. 11, 2003, Kryzak et al.
U.S. Appl. No. 10/659,974, filed Sep. 11, 2003, Kryzak et al.

(Continued)

*Primary Examiner*—Tesfaldet Bocure
(74) *Attorney, Agent, or Firm*—Timothy W. Markison; Justin Liu

(57) ABSTRACT

A receiver termination network is included in a high-speed receiver that also includes a receiver analog front-end and a data recovery module. The receiver termination network includes a DC matched termination circuit and an AC coupled bias circuit. The DC matched termination circuit is operably coupled to provide a termination of a transmission line coupling the high-speed receiver to a transmission source and to receive high-speed data via the transmission line. The AC coupled bias circuit is operably coupled to provide a common mode reference and to high-pass filter the high-speed data to produce filtered high-speed data. The receiver analog front-end is biased in accordance with the common mode reference and is operably coupled to amplify the filtered high-speed data to produce amplified high-speed data.

22 Claims, 5 Drawing Sheets

OTHER PUBLICATIONS

U.S. Appl. No. 10/660,159, filed Sep. 11, 2003, Groen et al.
U.S. Appl. No. 10/660,016, filed Sep. 11, 2003, Jenkins.
U.S. Appl. No. 10/659,973, filed Sep. 11, 2003, Groen et al.
U.S. Appl. No. 10/660,190, filed Sep. 11, 2003, Groen.
U.S. Appl. No. 10/659,916, filed Sep. 11, 2003, Black et al.
U.S. Appl. No. 10/659,978, filed Sep. 11, 2003, Groen et al.
U.S. Appl. No. 10/660,235, filed Sep. 11, 2003, Boecker et al.
U.S. Appl. No. 10/659,966, filed Sep. 11, 2003, Chuang et al.
U.S. Appl. No. 10/660,243, filed Sep. 11, 2003, Shafer et al.
Tirdad Sowlati et al., "High Density Capacitance Structures in Submicron CMOS for Low Power RF Applications," Aug. 6-7, 2001, pp. 243-246, ISLPED, Huntington Beach, California.
Intel Corporatin, "PCI Express™ I/O Cell Design" 2002, Intel Corporation, 2200 Mission College Blvd., Santa Clara, CA 95052.

* cited by examiner programmable logic device 10 programmable MGT 14 - 28 programmable receive PMA module 40

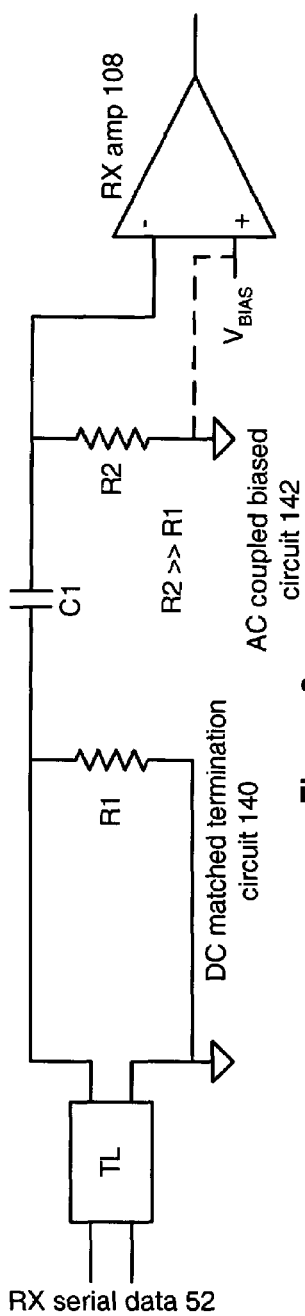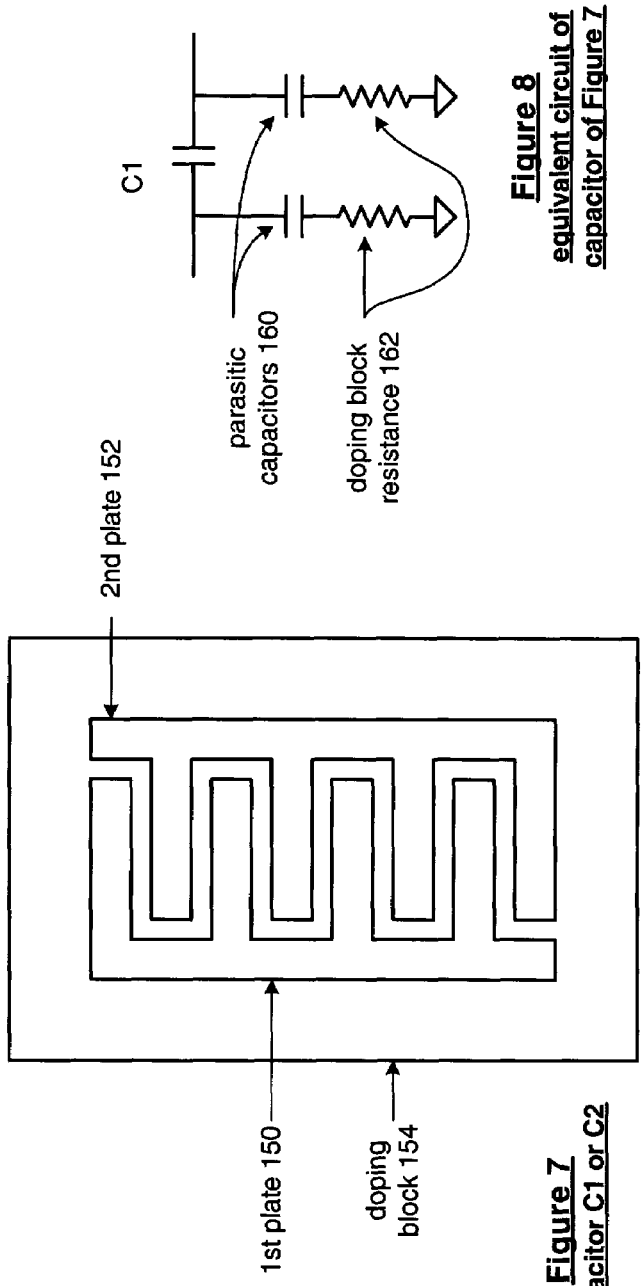

RECEIVER TERMINATION NETWORK AND APPLICATION THEREOF

FIELD OF THE INVENTION

This invention relates generally to communication systems and more particularly to an enhanced data conveyance within such communication systems.

BACKGROUND OF THE INVENTION

Communication systems are known to transport large amounts of data between a plurality of end user devices. Such end user devices include telephones, facsimile machines, computers, television sets, cellular phones, personal digital assistants, et cetera. As is also known, such communication systems may be a local area network (LAN) and/or a wide area network (WAN). A local area network is generally understood to be a network that interconnects a plurality of end user devices distributed over a localized area (e.g., up to a radius of 10 kilometers) and includes LAN infrastructure equipment. For example, a local area network may be used to interconnect workstations distributed within an office of a single building or a group of buildings, to interconnect computer based equipment distributed around a factory or hospital, et cetera. As is further known, local area networks may be wired local area networks or wireless local area networks. Wired local area networks typically have a star topology, ring topology, bus topology or hub/tree topology.

A wide area network is generally understood to be a network that covers a wide geographic area and includes WAN infrastructure equipment. Wide area networks include both public data networks and enterprise wide private data networks. A public data network is established and operated by a national network administrator specifically for data transmission. Such public data networks facilitate the inner working of equipment from different manufacturers. Accordingly, standards by the ITU-T have been established for conveying data within public data networks. Currently, there are two main types of public data networks: packet switched public data networks and circuit switched public data networks. For example, the public switched telephone network is a circuit switched public data network while the Internet is a packet switched public data network. Other examples of wide area networks include integrated service digital networks (ISDN) and broadband multiservice networks.

As is further known, communication systems may be networked together to yield larger communication systems, where such networking is typically referred to as internetworking. Internetworking is achieved via internetworking units that allow communication networks using the same or different protocols to be linked together. The internetworking units may be routers, gateways, protocol converters, bridges, and/or switches.

Regardless of the type of communication system (e.g., LAN, WAN, or internetworking system), each communication system employs a data conveyance protocol to ensure that data is accurately conveyed within the system. In general, a protocol is a formal set of rules and conventions that govern how system devices (e.g., end user devices, LAN infrastructure equipment, WAN infrastructure equipment, and/or internetworking units) exchange data within the communication system. Such protocols typically include regulations on receiver sensitivity (i.e., how noisy a received signal may be and how small its amplitude may be) for signals received by a system device or within a system device, and on transmit power of a signal from one system device to another or within the system device.

As is further known, each system device may process millions of bits of data per second or more. Accordingly, each system device includes high-speed data interfaces to input and output data efficiently. Such interfaces are typically implemented as integrated circuits that are mounted on a printed circuit board. A group of printed circuit boards may be mounted on a backplane and multiple backplanes may further be placed in a rack to make up the system device.

In an effort to meet the ever-increasing challenges of improving data conveyance speed, each system device includes an increasing number of integrated circuits, printed circuit boards (PCBs), and/or racks. Typically, the racks and PCBs are coupled together using coaxial cables, fiber optics, connectors, and/or wires. The integrated circuits on a printed circuit board are operably coupled together via copper traces (e.g., FR4 connections). As the number and complexity of the system devices increase, the distance between ICs, PCBs, and/or racks is increasing and is more diverse. For instance, some communication channels between ICs, PCBs, and/or racks may have one type of termination requirement (e.g., 50 Ohm DC coupling to $V_{DD}$, $V_{SS}$, or a mid-supply voltage), while others have a different type of termination requirement (e.g., 50 Ohm AC coupling).

To accommodate for the various types of channel termination, the termination had to be done off chip, i.e., the components that provide the termination are on the PCB. This requires additional components on the PCB and makes using an integrated circuit more complicated. It further increases the cost of the PCB.

Therefore, a need exists for programmable receiver termination network for use within receiver sections of high-speed data interfaces.

BRIEF SUMMARY OF THE INVENTION

The receiver termination network in accordance with the present invention substantially meets these needs and others. In one embodiment, the receiver termination network is included in a high-speed receiver that also includes a receiver analog front-end and a data recovery module. The receiver termination network includes a DC matched termination circuit and an AC coupled bias circuit. The DC matched termination circuit is operably coupled to provide a termination of a transmission line coupling the high-speed receiver to a transmission source and to receive high-speed data via the transmission line. The AC coupled bias circuit is operably coupled to provide a common mode reference and to high-pass filter the high-speed data to produce filtered high-speed data. The receiver analog front-end is biased in accordance with the common mode reference and is operably coupled to amplify the filtered high-speed data to produce amplified high-speed data. The data recovery module is operably coupled to recover data from the amplified high-speed data. The receiver termination network may be programmed for use within a variety of high-speed receivers that have varying termination requirements.

BRIEF DESCRIPTION OF THE DRAWINGS

FIG. 6 is a schematic block diagram of a further alternate embodiment of a receiver termination network in accordance with the present invention;

FIG. 7 is a graphical representation of an integrated circuit implementation of the capacitors used within the receiver termination network in accordance with the present invention; and FIG. 8 is a schematic block diagram of an equivalent circuit of the capacitor of FIG. 7.

DETAILED DESCRIPTION OF THE INVENTION

Figure 1:
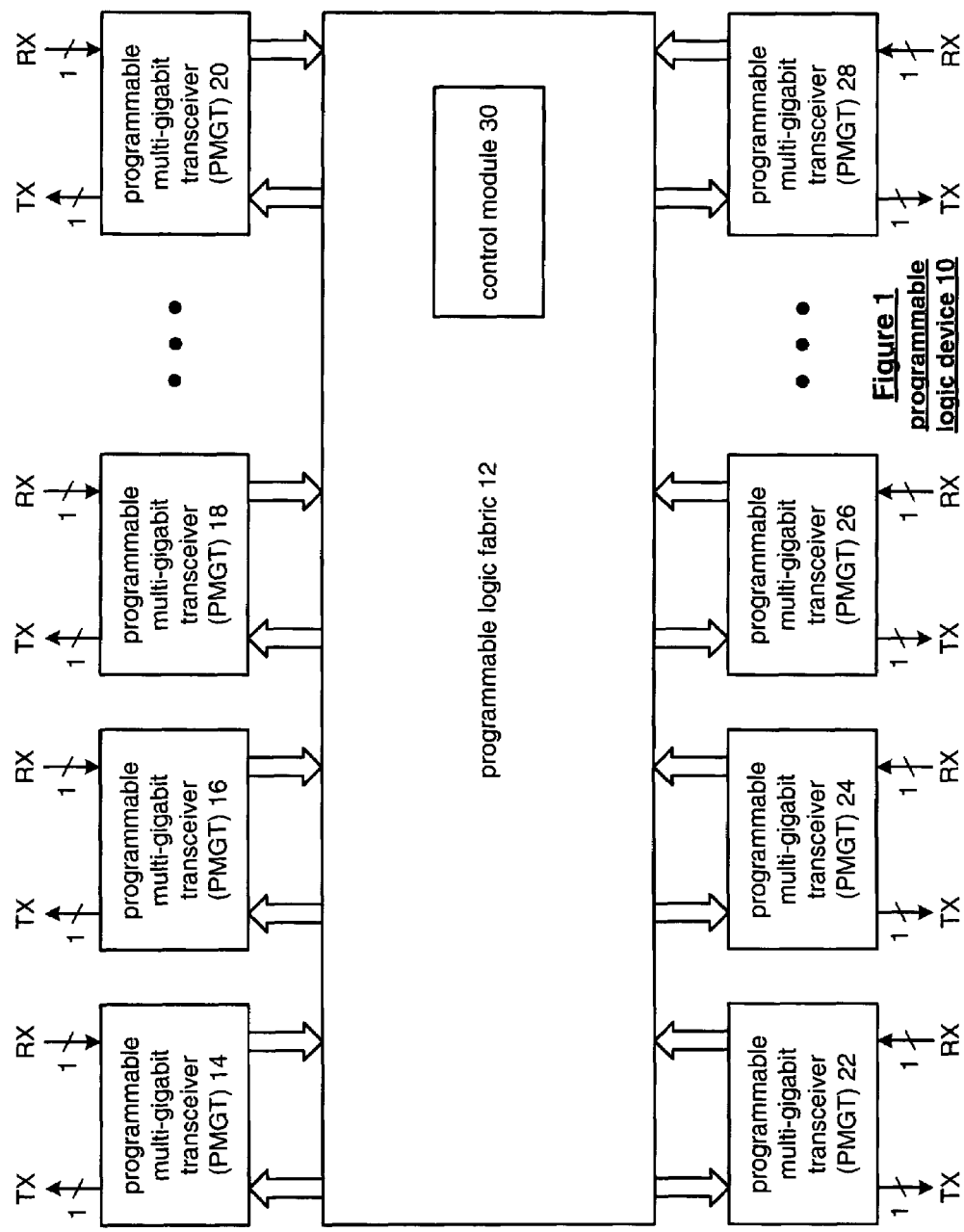
FIG. 1 is a schematic block diagram of a programmable logic device in accordance with the present invention.

FIG. 1 is a schematic block diagram of a programmable logic device 10 that includes programmable logic fabric 12, a plurality of programmable multi-gigabit transceivers (PMGT) 14-28 and a control module 30. The programmable logic device 10 may be, for instance, a programmable logic array device, a programmable array logic device, an erasable programmable logic device, and/or a field programmable gate array (FPGA). When the programmable logic device 10 is a field programmable gate array (FPGA), the programmable logic fabric 12 may be implemented as a symmetric array configuration, a row-based configuration, a sea-of-gates configuration, and/or a hierarchical programmable logic device configuration. The programmable logic fabric 12 may further include at least one dedicated fixed processor, such as a microprocessor core, to further facilitate the programmable flexibility offered by a programmable logic device 10.

The control module 30 may be contained within the programmable logic fabric 12 or it may be a separate module. In either implementation, the control module 30 generates the control signals to program each of the transmit and receive sections of the programmable multi-gigabit transceivers 14-28. In general, each of the programmable multi-gigabit transceivers 14-28 performs a serial-to-parallel conversion on received data and performs a parallel-to-serial conversion on transmit data. The parallel data may be 8-bits, 16-bits, 32-bits, 64-bits, et cetera wide. Typically, the serial data will be a 1-bit stream of data that may be a binary level signal, multi-level signal, etc. Further, two or more programmable multi-gigabit transceivers may be bonded together to provide greater transmitting speeds. For example, if multi-gigabit transceivers 14, 16 and 18 are transceiving data at 3.125 gigabits-per-second, the transceivers 14-18 may be bonded together such that the effective serial rate is 3 times 3.125 gigabits-per-second.

Each of the programmable multi-gigabit transceivers 14-28 may be individually programmed to conform to separate standards. In addition, the transmit path and receive path of each multi-gigabit transceiver 14-28 may be separately programmed such that the transmit path of a transceiver is supporting one standard while the receive path of the same transceiver is supporting a different standard. Further, the serial rates of the transmit path and receive path may be programmed from 1 gigabit-per-second to tens of gigabits-per-second. The size of the parallel data in the transmit and receive sections, or paths, is also programmable and may vary from 8-bits, 16-bits, 32-bits, 64-bits, et cetera.

Figure 2:
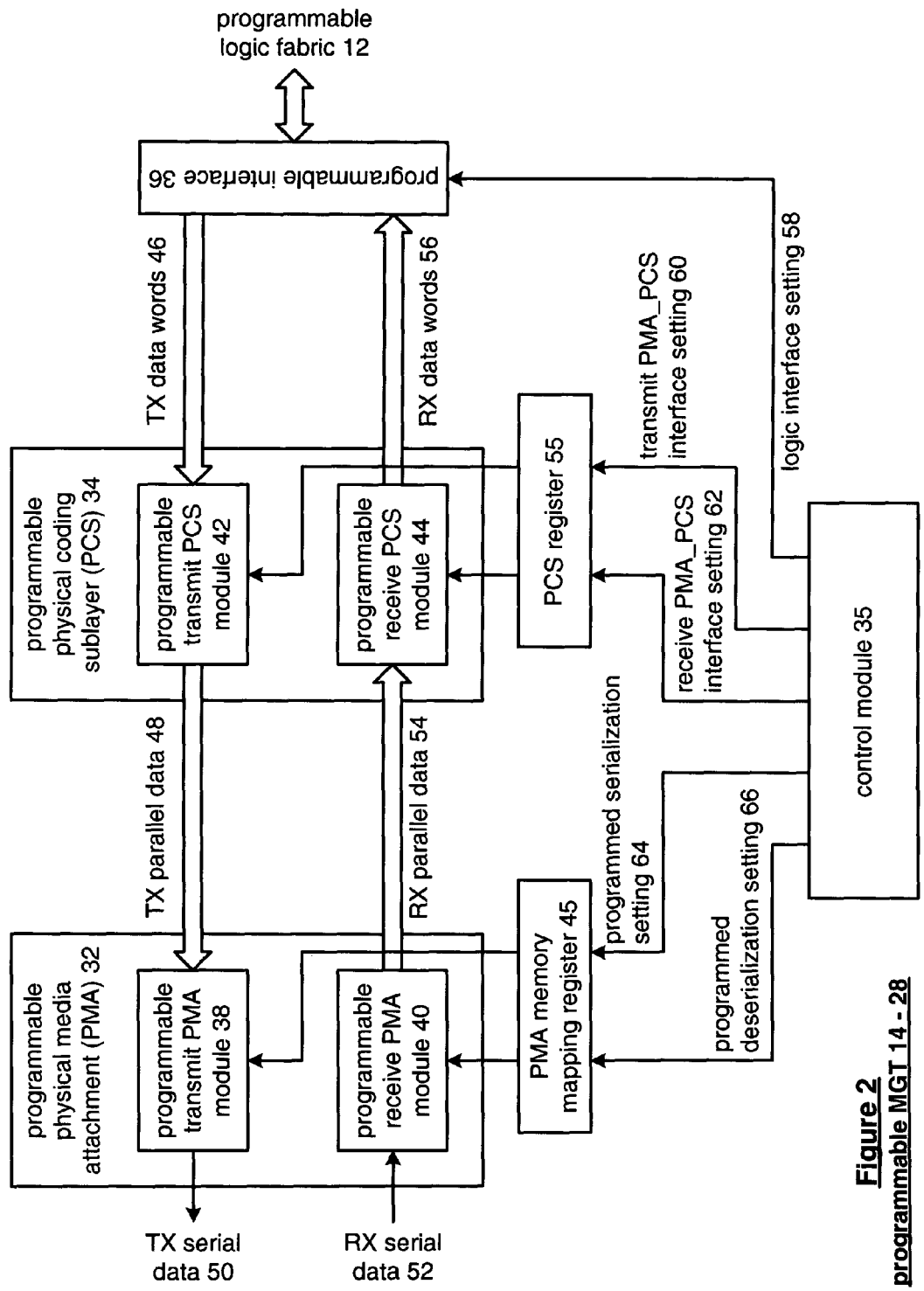
FIG. 2 is a schematic block diagram of a programmable multi-gigabit transceiver in accordance with the present invention.

FIG. 2 is a schematic block diagram of one embodiment of a representative one of the programmable multi-gigabit transceivers 14-28. As shown, the programmable multi-gigabit transceiver includes a programmable physical media attachment (PMA) module 32, a programmable physical coding sub-layer (PCS) module 34, a programmable interface 36, a control module 35, a PMA memory mapping register 45 and a PCS register 55. The control module 35, based on the desired mode of operation for the individual programmable multi-gigabit transceiver 14-28, generates a programmed deserialization setting 66, a programmed serialization setting 64, a receive PMA_PCS interface setting 62, a transmit PMA_PCS interface setting 60, and a logic interface setting 58. The control module 35 may be a separate device within each of the multi-gigabit transceivers and/or included within the control module 30. In either embodiment of the PMGT control module 35, the programmable logic device control module 30 determines the corresponding overall desired operating conditions for the programmable logic device 10 and provides the corresponding operating parameters for a given multi-gigabit transceiver to its control module 35, which generates the settings 58-66.

Figure 3:
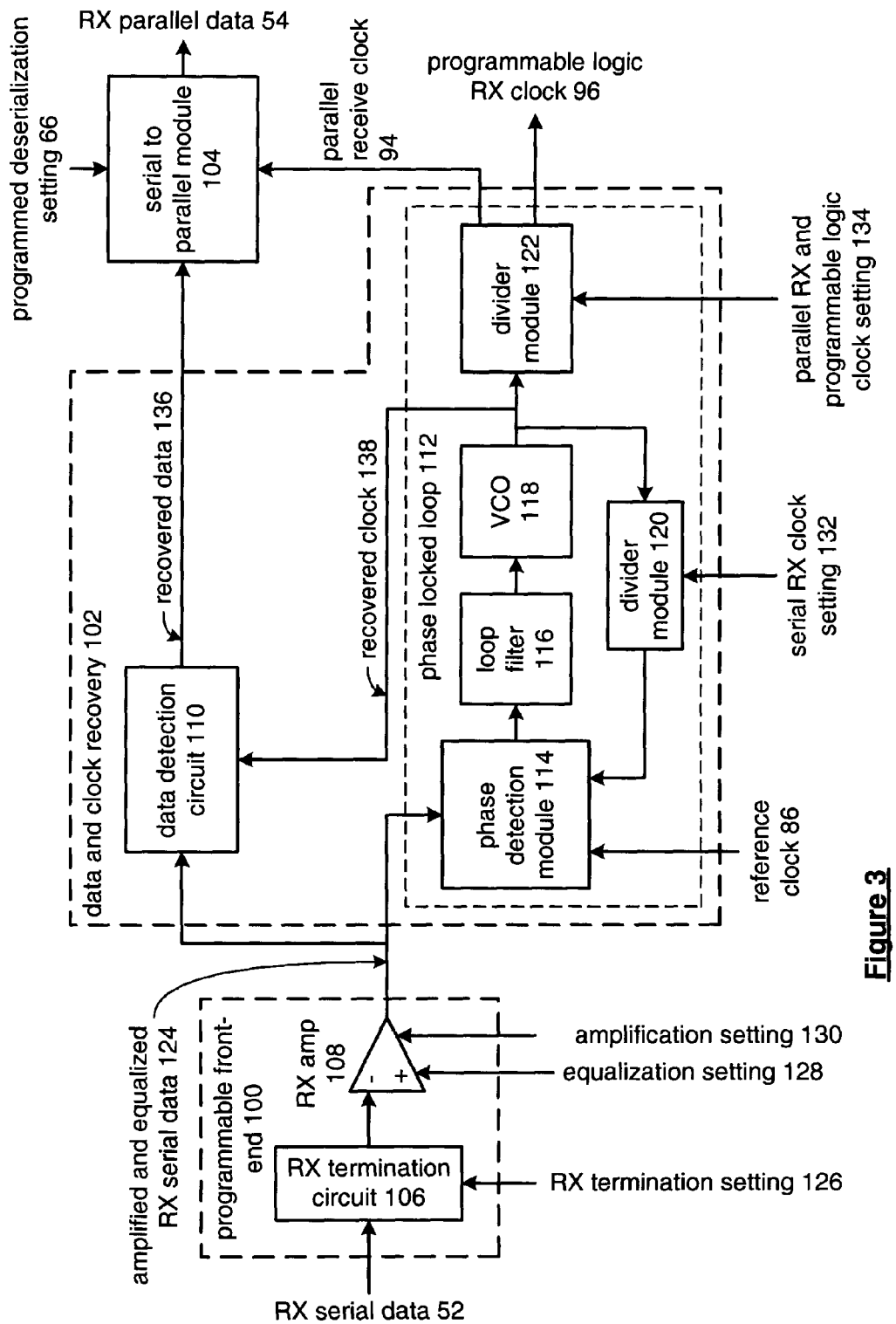
FIG. 3 is a schematic block diagram of a programmable receive physical media attachment (PMA) module in accordance with the present invention.

The programmable physical media attachment (PMA) module 32 includes a programmable transmit PMA module 38 and a programmable receive PMA module 40. The programmable transmit PMA module 38 is operably coupled to convert transmit parallel data 48 into transmit serial data 50 in accordance with the programmed serialization setting 64. The programmed serialization setting 64 indicates the desired rate of the transmit serial data 50, the desired rate of the transmit parallel data 48, and the data width of the transmit parallel data 48. The programmable receive PMA module 40, which will be described in greater detail with reference to FIG. 3, is operably coupled to convert receive serial data 52 into receive parallel data 54 based on the programmed deserialization setting 66. The programmed deserialization setting 66 indicates the rate of the receive serial data 52, the desired rate of the receive parallel data 54, and the data width of the receive parallel data 54. The PMA memory mapping register 45 may store the serialization setting 64 and the deserialization setting 66.

The programmable physical coding sub-layer (PCS) module 34 includes a programmable transmit PCS module 42 and a programmable receive PCS module 44. The programmable transmit PCS module 42 receives transmit data words 46 from the programmable logic fabric 12 via the programmable interface 36 and converts them into the transmit parallel data 48 in accordance with the transmit PMA_PCS interface setting 60. The transmit PMA_PCS interface setting 60 indicates the rate of the transmit data words 46, the size of the transmit data words (e.g., 1-byte, 2-bytes, 3-bytes, 4-bytes, et cetera) and the corresponding transmission rate of the transmit parallel data 48. The programmable receive PCS module 44 converts the receive parallel data 54 into receive data words 56 in accordance with the receive PMA_PCS interface setting 62. The receive PMA_PCS interface setting 62 indicates the rate at which the receive parallel data 54 will be received, the width of the parallel data 54, the transmit rate of the receive data words 56 and the word size of the receive data words 56.

The control module 35 also generates the logic interface setting 58 that provides the rates at which the transmit data words 46 and receive data words 56 will be transceived with the programmable logic fabric 12. Note that the transmit data words 46 may be received from the programmable logic fabric 12 at a different rate than the receive data words 56 are provided to the programmable logic fabric 12.

As one of average skill in the art will appreciate, each of the modules within the PMA module 32 and PCS module 34 may be individually programmed to support a desired data transfer rate. The data transfer rate may be in accordance with a particular standard, such that the receive path, i.e., the programmable receive PMA module 40 and the programmable receive PCS module 44, may be programmed in accordance with one standard while the transmit path, i.e., the programmable transmit PCS module 42 and the programmable transmit PMA module 38, may be programmed in accordance with another standard.

FIG. 3 illustrates a schematic block diagram of the programmable receive PMA module 40 that includes a programmable front-end 100, a data and clock recovery module 102, and a serial-to-parallel module 104. The programmable front-end 100 includes a receiver termination circuit 106 and a receiver amplifier 108. The data and clock recovery module 102 includes a data detection circuit 110 and a phase locked loop 112. The phase locked loop 112 includes a phase detection module 114, a loop filter 116, a voltage controlled oscillator 118, a $1^{st}$ divider module 120, and a $2^{nd}$ divider module 122.

The programmable front-end 100, which will be described in greater detail with reference to FIGS. 4-8, is operably coupled to receive the receive serial data 52 and produce amplified and equalized receive serial data 124 therefrom. To achieve this, the receiver termination circuit 106 is programmed in accordance with a receive termination setting 126 to provide the appropriate termination for the transmission line between the programmable receiver PMA module 40 and the source that originally transmitted the receive serial data 52. The receive termination setting 126 may indicate, for instance, whether the receive serial data 52 is a single-ended signal or a differential signal, the impedance of the termination line, and the biasing of the receiver termination circuit 106.

The receiver termination circuit 106 further biases the receive serial data 52 and provides the bias adjusted signal to the receiver amplifier 108. The gain and equalization settings of the receiver amplifier 108 may be adjusted in accordance with the equalization setting 128 and the amplification setting 130, respectively. Note that the receive termination setting 126, the equalization setting 128, and the amplification setting 130 are part of the programmed deserialization setting 66 provided by the control module 35.

The data and clock recovery circuit 102 receives the amplified and equalized receive serial data 124 via the phase detection module 114 of phase locked loop 112 and via the data detection circuit 110. The phase detection module 114 has been initialized prior to receiving the amplified and equalized receive serial data 124 by comparing the phase and/or frequency of the reference clock 86 with a feedback reference clock produced by divider module 120. Based on this phase and/or frequency difference, the phase detection module 114 produces a corresponding current that is provided to loop filter 116. The loop filter 116 converts the current into a control voltage that adjusts the output frequency of the voltage controlled oscillator 118. The divider module 120, based on a serial receive clock setting 132, divides the output oscillation produced by the VCO 118 to produce the feedback signal. Once the amplified and equalized receive serial data 124 is received, the phase detection module 114 compares the phase of the amplified and equalized receive serial data 124 with the phase of the feedback signal. Based on a phase difference between the amplified and equalized receive serial data 124 and the feedback signal, a current signal is produced.

The phase detection module 114 provides the current signal to the loop filter 116, which converts it into a control voltage that controls the output frequency of the voltage controlled oscillator 118. At this point, the output of the voltage controlled oscillator 118 corresponds to a recovered clock 138. The recovered clock 138 is provided to the divider module 122, the data detection circuit 110 and to the serial-to-parallel module 104 via the divider module 122. The data detection module 110 utilizes the recovered clock 138 to recover recovered data 136 from the amplified equalized receive serial data 124. The divider module 122 divides the recovered clock 138, in accordance with a parallel receive and programmable logic clock setting 134, to produce the parallel receive clock 94 and the programmable logic receive clock 96. Note that the serial receive clock setting 132 and the parallel receive and programmable logic clock setting 134 are part of the programmable deserialization setting 66 provided to the programmable receive PMA module 40 by the control module 35.

The serial-to-parallel module 104, which may include an elastic store buffer, receives the recovered data 136 at a serial rate in accordance with the recovered clock 138. Based on a serial-to-parallel setting 135 and the parallel receive clock 94, the serial-to-parallel module 104 outputs the receive parallel data 54. The programmable deserialization setting 66 indicates the rate and data width of the receive parallel data 54.

Figure 4:
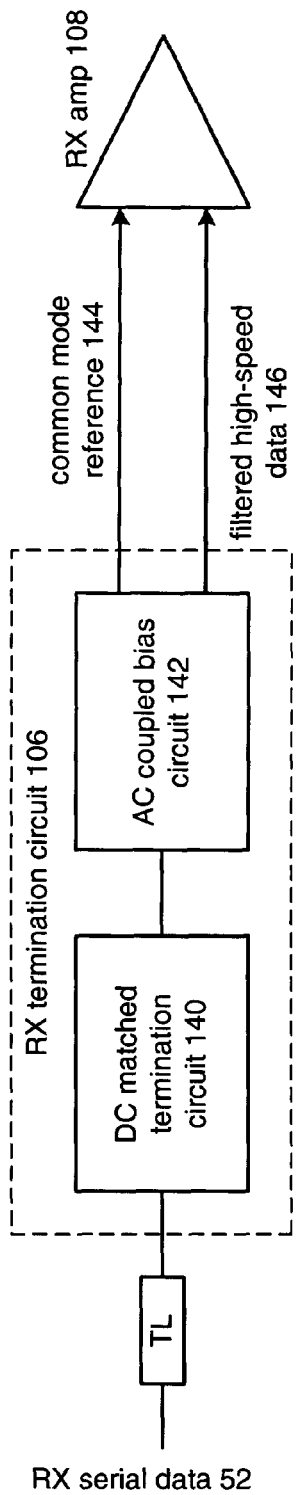
FIG. 4 is a schematic block diagram of a receiver termination network in accordance with the present invention.

FIG. 4 is a schematic block diagram of the receiver termination circuit, or network, 106 that includes a DC matched termination circuit 140 and an AC coupled bias circuit 142. The DC matched termination circuit 140 receives the receive serial data 52 via a transmission line (TL). The DC termination circuit 140 provides a impedance matching the transmission line and is DC coupled to the transmission line. The DC matched termination circuit 140 will be described in greater detail with reference to FIGS. 5 and 6.

The AC coupled bias circuit 142 receives the receive serial data 52 via the DC matched termination circuit 140 and produces a common mode reference 144 therefrom and further filters the receive serial data 52 to produce filtered high-speed data 146. The common mode reference 144 is provided to the receiver amplifier 108 of the programmable front-end 100. The details of the AC coupled bias circuit 142 will be described in greater detail with reference to FIGS. 5 and 6.

Figure 5:
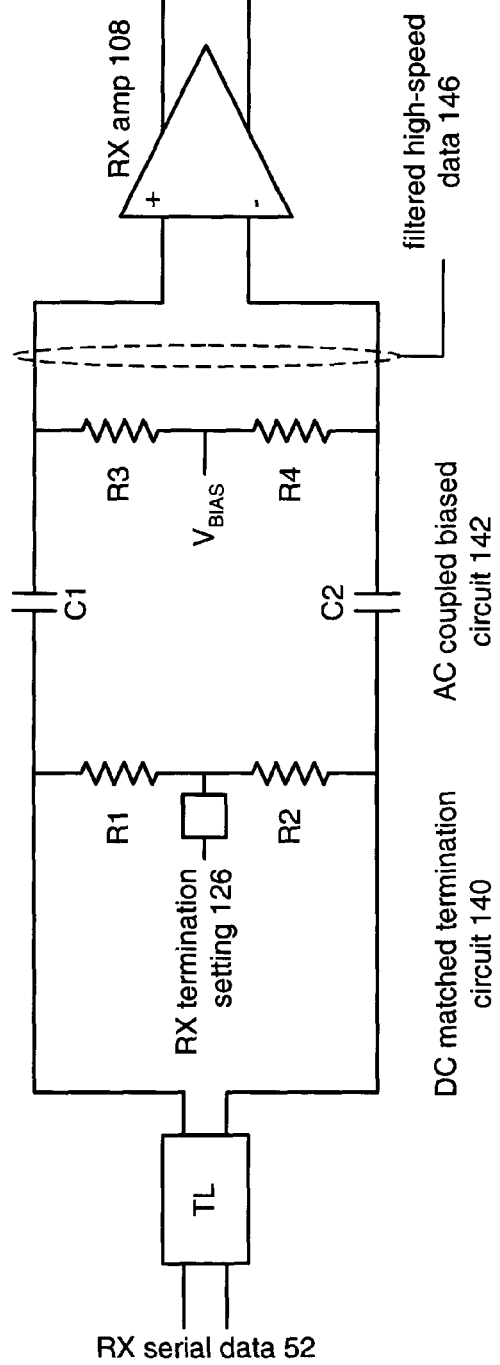
FIG. 5 is an alternate schematic block diagram of a receiver termination network in accordance with the present invention.

FIG. 5 illustrates a differential signaling implementation of the receiver termination circuit, or network, 106 that includes the DC matched termination circuit 140 and the AC coupled bias circuit 142. The DC matched termination circuit includes a pair of resistors R1 and R2 and an integrated circuit pad coupled to receive a receiver termination setting 126. The receiver termination setting 126 allows the DC matched termination circuit to be terminated with respect to $V_{DD}$ (i.e., the supply voltage), $V_{SS}$ (i.e., the supply return), or a mid-supply voltage. The values of resistors R1 and R2 are dependent on the impedance of the transmission line and the desired matched termination. For example, resistors R1 and R2 may be 50 Ohm resistors.

The AC coupled bias circuit 142 includes capacitors C1 and C2 and impedances R3 and R4, which may be resistors or unity gain transconductance amplifiers. Note that the impedance values of impedances R3 and R4 are significantly bigger than the impedance values of R1 and R2. For example, impedances R3 and R4 may be 1 mega Ohm resistors or unity gain transconductance amplifiers having a transconductance value that corresponds to the inverse of the resistance values (e.g., 1/(1 mega Ohm)). Capacitors C1 and C2 provide AC coupling of the receive serial data 52 to the receiver amplifier 108. In addition, C1, C2, R3 and R4 provide a high-pass filter, with a corner frequency established by the values of the resistors and capacitors, for the receive serial data 52, thereby producing the filtered high-speed data 146. As is further shown, the tap of impedances R3 and R4 are coupled to a bias voltage ($V_{bias}$). The bias voltage may be set to a particular level to provide the common mode reference 144 for the receiver amplifier 108. As such, the receiver termination network 106 is programmable via the receiver termination setting 126 and/or via the bias voltage $V_{bias}$. Note that if the unity gain transconductance amplifiers are used for impedances R3 and R4, then their non-inverting inputs coupled together and to the bias voltage and their inverting inputs are coupled to the input lines, respectively.

FIG. 6 illustrates a single-ended implementation of the receiver termination circuit, or network, 106. In this embodiment, the DC matched termination circuit 140 includes resistor R1, which is coupled across the transmission line. The resistance value of R1 is selected to match the impedance of the transmission line and/or the desired termination impedance. The AC coupled bias circuit 142 includes capacitor C1 and resistor R2. Capacitor C1 AC couples the receive serial data 52 to the receiver amplifier 108. In addition, capacitor C1 in combination with resistor R2 provide a high-pass filter for the receive serial data 52 such that the signal provided to the receiver amplifier 108 is filtered. The bias level of the receiver amplifier may be adjusted via the bias voltage ($V_{bias}$). Note that resistor R2 may optionally be connected to $V_{bias}$ (as shown by the dashed line) or another voltage.

The capacitors C1 and C2 of FIG. 5 and the capacitor C1 of FIG. 6 may be fabricated on an integrated circuit in accordance with the integrated circuit diagram of FIG. 7. As shown, the capacitor includes a $1^{st}$ plate 150, a $2^{nd}$ plate 152, and a doping block 154. The $1^{st}$ plate is fabricated on the same metal layer as the $2^{nd}$ plate 152 and both have an interlacing finger design. As one of average skill in the art will appreciate, the $1^{st}$ plate 150 and $2^{nd}$ plate 152 may be fabricated on multiple metal layers connected with vias to provide greater surface area. The doping block 154 encompasses the $1^{st}$ and $2^{nd}$ plates to provide resistance in series with the parasitic capacitance produced by the $1^{st}$ and $2^{nd}$ plates 150 and 152. The doping block 154 may comprise a doping material that provides a resistance with respect to ground.

FIG. 8 is a schematic block diagram illustrating an equivalent circuit of the capacitor of FIG. 7. Capacitor C1, as indicated in FIG. 8, is produced via the $1^{st}$ and $2^{nd}$ plates 150 and 152 of FIG. 7. The plates 150 and 152 produce parasitic capacitors 160 with respect to ground and/or to the substrate. The doping block adds resistance 162 in series with the parasitic capacitor 160. In one embodiment, the doping block resistance 162 is about 2 kilo Ohms, which, in series with the parasitic capacitance 160, substantially reduces the adverse effects of the parasitic capacitance 160. Note that the capacitance value of C1 and C2 may be approximately 10 pico Farads.

The preceding discussion has presented a programmable receiver termination network that is programmable to facilitate a variety of termination requirements. By including a DC circuit and AC coupling circuit within the programmable network, high-pass filtering is achieved as well as providing the desired DC termination and common mode biasing. As one of average skill in the art will appreciate, other embodiments may be derived from the teaching of the present invention without deviating from the scope of the claims.

What is claimed is:

1. A high-speed receiver comprising:
 a receiver termination network that includes:
  a DC matched termination circuit operably coupled to provide a termination of a transmission line coupling the high-speed receiver to a transmission source and to receive high-speed data via the transmission line; and
  an AC coupled bias circuit operably coupled to provide a common mode reference and to high pass filter the high-speed data to produce the filtered high-speed data;
 a receiver analog front-end biased in accordance with the common mode reference, wherein the receiver analog front-end is operably coupled to amplify the filtered high-speed data to produce amplified high-speed data; and
 a data recovery module operably coupled to recover data from the amplified high-speed data.

2. The high-speed receiver of claim 1, wherein the DC matched termination circuit comprises:
 first resistor having an impedance corresponding to impedance of the transmission line; and
 second resistor having an impedance corresponding to the impedance of the transmission line, wherein the first and second resistors are coupled in series and the series combination of the first and second resistors is coupled to the transmission line.

3. The high-speed receiver of claim 2, wherein the DC matched termination circuit further comprises:
 a termination biasing integrated circuit pad operably coupled to a center node of the series combination of the first and second resistors to provide selective coupling of the center node to a supply voltage, to a supply return voltage, or to a mid-supply voltage for proper termination of the transmission source.

4. The high-speed receiver of claim 2, wherein the AC coupled bias circuit comprises:
 first capacitor having a first plate and a second plate, wherein the first plate of the first capacitor is operably coupled to the first resistor;
 second capacitor having a first plate and a second plate, wherein the first plate of the second capacitor is operably coupled to the second resistor;
 first impedance having a first node operably coupled to the second plate of the first capacitor; and
 second impedance having a first node operably coupled to the second plate of the second capacitor, wherein a second node of the first impedance is operably coupled to a second node of the second impedance and coupled to a bias voltage, wherein impedance of the first and second impedances is at least one order of magnitude greater than the impedance of the first and second resistors, and wherein capacitance of the first and second capacitors, in combination with the first and second impedances, establish a corner frequency for the high-pass filter.

5. The high-speed receiver of claim 4, wherein each of the first and second capacitors further comprises:
 the first plate and second plate configured in a finger arrangement to produce a capacitor structure; and a doping block encompassing the capacitor structure to provide an impedance in series with parasitic capacitance of the capacitor structure.

6. The high-speed receiver of claim 4, wherein each of the first and second capacitors further comprises:
the first plate being fabricated on at least two metal layers operably coupled with a first via; and
the second plate being fabricated on the at least two metal layers operably coupled with a second via.

7. The high-speed receiver of claim 1, wherein the DC matched termination circuit comprises:
a resistor having an impedance corresponding to impedance of the transmission line.

8. The high-speed receiver of claim 7, wherein the AC coupled bias circuit comprises:
a capacitor having a first plate and a second plate, wherein the first plate of the first capacitor is operably coupled to the resistor; and
a bias impedance having a first node operably coupled to the second plate of the first capacitor and a second node coupled to a supply return, wherein impedance of the bias impedance is at least one order of magnitude greater than the impedance of the resistor, and wherein capacitance of the capacitor, in combination with the bias impedance, establish a corner frequency for the high-pass filter.

9. A multi-gigabit transceiver comprising:
transmit section operably coupled to convert parallel output data into high-speed output serial data; and
receiver section that includes:
a receiver termination network that includes:
a DC matched termination circuit operably coupled to provide a termination of a transmission line coupling the high-speed receiver to a transmission source and to receive high-speed serial data via the transmission line; and
an AC coupled bias circuit operably coupled to provide a common mode reference and to high pass filter the high-speed serial data to produce the filtered high-speed serial data;
a receiver analog front-end biased in accordance with the common mode reference, wherein the receiver analog front-end is operably coupled to amplify the filtered high-speed serial data to produce amplified high-speed serial data; and
a data recovery module operably coupled to recover data from the amplified high-speed serial data.

10. The multi-gigabit transceiver of claim 9, wherein the DC matched termination circuit comprises:
first resistor having an impedance corresponding to impedance of the transmission line; and
second resistor having an impedance corresponding to the impedance of the transmission line, wherein the first and second resistors are coupled in series and the series combination of the first and second resistors is coupled to the transmission line.

11. The multi-gigabit transceiver of claim 10, wherein the DC matched termination circuit further comprises:
a termination biasing integrated circuit pad operably coupled to a center node of the series combination of the first and second resistors to provide selective coupling of the center node to a supply voltage, to a supply return voltage, or to a mid-supply voltage for proper termination of the transmission source.

12. The multi-gigabit transceiver of claim 10, wherein the AC coupled bias circuit comprises:
first capacitor having a first plate and a second plate, wherein the first plate of the first capacitor is operably coupled to the first resistor;
second capacitor having a first plate and a second plate, wherein the first plate of the second capacitor is operably coupled to the second resistor;
first impedance having a first node operably coupled to the second plate of the first capacitor; and
second impedance having a first node operably coupled to the second plate of the second capacitor, wherein a second node of the first impedance is operably coupled to a second node of the second impedance and coupled to a bias voltage, wherein impedance of the first and second impedances is at least one order of magnitude greater than the impedance of the first and second resistors, and wherein capacitance of the first and second capacitors, in combination with the first and second impedances, establish a corner frequency for the high-pass filter.

13. The multi-gigabit transceiver of claim 9, wherein the DC matched termination circuit comprises:
a resistor having an impedance corresponding to impedance of the transmission line.

14. The multi-gigabit transceiver of claim 13, wherein the AC coupled bias circuit comprises:
a capacitor having a first plate and a second plate, wherein the first plate of the first capacitor is operably coupled to the resistor; and
bias impedance having a first node operably coupled to the second plate of the first capacitor and a second node coupled to a supply return, wherein impedance of the bias impedance is at least one order of magnitude greater than the impedance of the resistor, and wherein capacitance of the capacitor, in combination with the bias impedance, establish a corner frequency for the high-pass filter.

15. A receiver termination network comprising:
a DC matched termination circuit operably coupled to provide a termination of a transmission line coupling a high-speed receiver to a transmission source and to receive high-speed data via the transmission line; and
an AC coupled bias circuit operably coupled to high pass filter the high-speed data to produce filtered high-speed data and operably coupled to produce a common mode reference.

16. The receiver termination network of claim 15, wherein the DC matched termination circuit comprises:
first resistor having an impedance corresponding to impedance of the transmission line; and
second resistor having an impedance corresponding to the impedance of the transmission line, wherein the first and second resistors are coupled in series and the series combination of the first and second resistors is coupled to the transmission line.

17. The receiver termination network of claim 16, wherein the DC matched termination circuit further comprises:
a termination biasing integrated circuit pad operably coupled to a center node of the series combination of the first and second resistors to provide selective coupling of the center node to a supply voltage, to a supply return voltage, or to a mid-supply voltage for proper termination of the transmission source.

18. The receiver termination network of claim 16, wherein the AC coupled bias circuit comprises:

first capacitor having a first plate and a second plate, wherein the first plate of the first capacitor is operably coupled to the first resistor;

second capacitor having a first plate and a second plate, wherein the first plate of the second capacitor is operably coupled to the second resistor;

first impedance having a first node operably coupled to the second plate of the first capacitor; and second impedance having a first node operably coupled to the second plate of the second capacitor, wherein a second node of the first impedance is operably coupled to a second node of the second impedance and coupled to a bias voltage, wherein impedance of the first and second impedances is at least one order of magnitude greater than the impedance of the first and second resistors, and wherein capacitance of the first and second capacitors, in combination with the first and second impedances, establish a corner frequency for the high-pass filter.

19. The receiver termination network of claim 18, wherein each of the first and second capacitors further comprises:

the first plate and second plate configured in a finger arrangement to produce a capacitor structure; and a doping block encompassing the capacitor structure to provide an impedance in series with parasitic capacitance of the capacitor structure.

20. The receiver termination network of claim 18, wherein each of the first and second capacitors further comprises:

the first plate being fabricated on at least two metal layers operably coupled with a first via; and the second plate being fabricated on the at least two metal layers operably coupled with a second via.

21. The receiver termination network of claim 16, wherein the DC matched termination circuit comprises:

a resistor having an impedance corresponding to impedance of the transmission line.

22. The receiver termination network of claim 21, wherein the AC coupled bias circuit comprises:

a capacitor having a first plate and a second plate, wherein the first plate of the first capacitor is operably coupled to the resistor; and a bias impedance having a first node operably coupled to the second plate of the first capacitor and a second node coupled to a supply return, wherein impedance of the bias impedance is at least one order of magnitude greater than the impedance of the resistor, and wherein capacitance of the capacitor, in combination with the bias impedance, establish a corner frequency for the high-pass filter.

* * * * *